Figure 1:
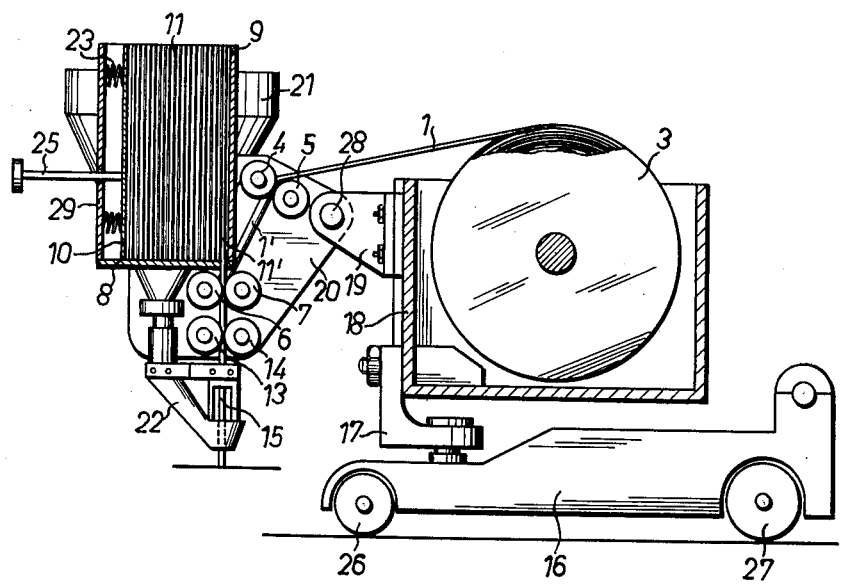

April 24, 1962

A. GSCHAIDER 3,031,567

AUTOMATIC ARC WELDING MACHINE

Filed Dec. 3, 1959

2 Sheets-Sheet 1

INVENTOR
Alfred GSCHAIDER

BY Toulmin & Toulmin

ATTORNEYS

April 24, 1962     A. GSCHAIDER     3,031,567
AUTOMATIC ARC WELDING MACHINE
Filed Dec. 3, 1959     2 Sheets-Sheet 2

INVENTOR
Alfred GSCHAIDER

BY *Toulmin & Toulmin*
ATTORNEYS

United States Patent Office 3,031,567
Patented Apr. 24, 1962

3,031,567
AUTOMATIC ARC WELDING MACHINE
Alfred Gschaider, 9 Holthauserhofe, Mulheim (Ruhr), Germany
Filed Dec. 3, 1959, Ser. No. 857,053
Claims priority, application Germany Dec. 4, 1958
3 Claims. (Cl. 219—130)

The present invention relates to an automatic arc welding machine and more in particular to an automatic arc welding machine with a continuous supply of the welding electrode to the welding head.

It is known in the art to protect those parts of machines and apparatus by means of electro-welding which are particularly subject to abrasion. This is generally done by surface welding and particularly by protective gas welding performed under a layer of powder. In order to obtain a durable protective cover by these welding processes a welding material must be used containing hardening alloys such as, for example, in addition to carbon, materials like chromium, nickel, and tungsten. Now, it is difficult and even practically impossible to produce welding wires of such alloyed materials with the necessary supple flexibility necessary for being able to roll a great length of welding wires on a reel wherefrom it can continuously be payed out to the welding head of an automatic arc welding machine.

It has therefore been proposed to use an ordinary welding wire of sufficient flexibility and to supply the hardening components in the form of a welding powder alloying with the melting welding wire. However, it was found that a welding powder containing the hardening components tends to separate into its various fractions when supplied to the surface to be protected. Consequently, it is not possible to obtain a protective layer of the desirable homogeneous composition and structure. A similar separation occurs when using the welding powder in tubular electrodes.

For the above reasons an attempt has been made in the art to assemble single welding rods to a continuous welding wire by various connection means such as sleeves, threads, grooves, and springs, or by welding. It will easily be apparent that these connections are complicated, expensive, and unreliable.

With the foregoing in mind it is an object of the present invention to provide an automatic arc welding machine comprising means for continuously supplying a welding electrode to the welding head which electrode can be of the type containing hardening alloys such as chromium, nickel, or tungsten.

A further object of the present invention is to provide an automatic arc welding machine comprising means for continuously supplying a welding electrode to the welding head and which machine is capable of continuously providing materials with a wear-resistant protective layer of a highly homogeneous composition and structure.

It is still another object of the present invention to provide an automatic arc welding machine comprising means for continuously supplying a welding electrode to the welding head and with means for providing a continuous welding wire with hardening components in an uncomplicated unexpensive and reliable manner.

These objects are achieved by the automatic arc welding machine of the present invention according to which band-shaped flexible sheet strips are supplied from a rotary drum and brought next to rod electrodes which latter are payed out one after the other from a magazine, whereupon an end portion of the sheet strip and one electrode rod are passed between forming rollers which wrap the sheet around the electrode rod, whereafter the thus closed electrode is supplied to the welding head.

This arrangement makes it possible to combine a rather rigid welding rod containing hardening alloys with a flexible sheet sleeve, which latter can be rolled up and continuously supplied for coating successively and continuously individual welding rods, so as to obtain an uninterrupted and continuous supply of welding wire to the welding head.

Figure 2:
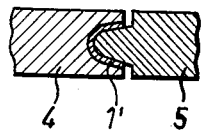
Figure 3:
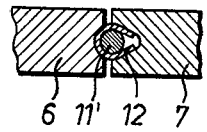
Figure 4:
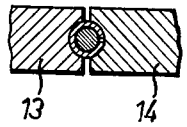
Figure 6:
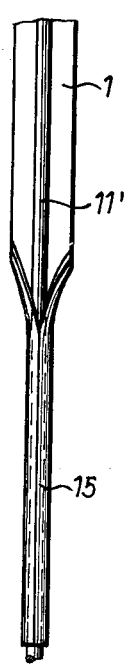
Figure 5:
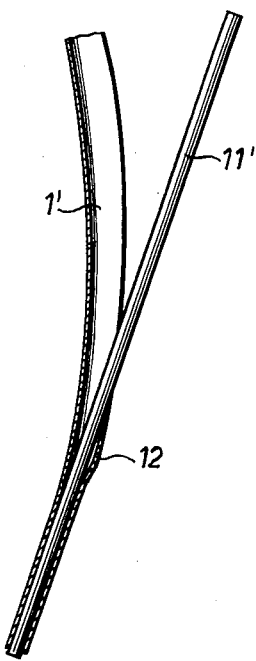

The invention will be more fully appreciated upon the following description of the accompanying drawings wherein:

FIGURE 1 is a side elevational view, partly in section of the automatic arc welding machine of the present invention comprising the rotary drum supplying the continuous sheet strip, the magazine supplying the individual welding rods and the pairs of forming rollers for combining the rods with the sheets so as to obtain a continuous and uninterrupted welding wire;

FIGURES 2, 3, and 4 are cross sectional views of the various pairs of forming rollers used in the automatic arc welding machine of the present invention;

FIGURES 5 and 6 are side elevational views of the welding wires in various stages of assembly.

Referring now to the drawings somewhat more in detail and turning first to FIGURE 1, the automatic arc welding machine of the invention has a movable frame 16 on wheels 26, 27, thus constituting a carriage, supporting a pivotable arm 17, which, in turn, supports a height adjustable frame 18 constituting the bearing for rotary drum 3. Frame 18 bears a projecting flange 19 on which latter a further frame 20 is pivotably mounted by means of a screw bolt 28. The frame 20 constitutes the support for magazine 9, the pairs of forming rollers 4, 5, 6, 7, 13, and 14, the powder supply means 21, and the welding head 22. The magazine 9 has a bottom 8 extending slightly above the pair of forming rollers 6, 7. In the magazine and extending substantially parallel to longitudinal wall 29 a displaceable wall 10 is disposed behind which are provided a plurality of welding rods 11 in vertical or substantially vertical position. The wall 10 is pressed against the rod by pressure springs 23 and can be moved in the direction towards the rods 11 by means of a screw rod 25.

The apparatus of the invention operates in the following manner:

The sheet strip 1 is pulled off rotary drum 3 by means of the pair of forming rollers 4, 5, and, when passing through these rollers is formed to assume a channel-like shape, as indicated by reference numeral 1′ in FIGURES 1, 2, and 5.

The thus formed sheet strip then travels to the next following pair of forming rollers 6, 7. The furthermost rod 11′ is then advanced by the manually or automatically operated screw rod 25 beyond the range of extension of wall 8, so that it falls downwardly into the channel-shaped sheet strip 1′. Immediately thereafter the lower end of rod 11′ comes into the range of forming rollers 6 and 7 which wrap the ends 12 of sheet strip 1′ about rod 11′ (see FIGURE 3). Thereafter, the last pair of forming rollers 13, 14 then completely wraps the sheet entirely about the rods, thus forming an integrally closed sleeve and thereby obtaining the final welding wire 15 (see FIGURES 5 and 6).

The process of forming the final welding wire comprising the aforementioned three stages performed by the three pairs of forming rollers are performed in close and rapid succession as illustrated, for example, in FIGURE 6, thereby a continuous supply of welding wire is obtained which is fed straight into the welding head.

The welding machine of the invention is of the type wherein the welding electrode is immersed into a welding powder and the electric arc is formed under cover of this powder between the work piece and the electrode. The welding wire can be conductive of current in a known manner in which case the sheet sleeve wrapped about the core consisting of the electrode rod is composed of an electrically conductive material. It is, however, also possible to effect the welding with the welding wire being currentless in which case the sleeve can consist of a foil of plastic material wrapped totally or partly about the rods. The interior of the foil may have a glue layer with which it is attached to the rod.

The core of the welding wire consisting of individual rods 11 can have any desired length. An alloyed or non-alloyed material can be used and rods of various compositions can be quickly exchanged in the magazine without difficulty. The sheet can also be composed of a neutral or alloying material or any material causing a desired reaction when melted. Preferably, a sheet is used having a thickness of from 0.15 to 0.8 millimeter while the rods can have a diameter of about 3 to 6 millimeters.

It will be understood that this invention is susceptible to modification in order to adapt it to different usages and conditions and, accordingly, it is desired to comprehend such modifications within this invention as may fall within the scope of the appended claims.

What I claim is:

1. An automatic arc welding machine comprising, in combination, a rotary supply drum with a continuous strip of sheet material being stored thereon, a magazine with a plurality of welding rods being stored therein, a welding head, and a plurality of pairs of forming rollers, pulling said strip of sheet material off said rotary supply drum, wrapping the same successively about said welding rods so as to obtain a continuous welding wire, and passing said welding wire to said welding head.

2. An automatic arc welding machine comprising, in combination, a rotary supply drum with a continuous strip of sheet material being stored thereon, a magazine with a plurality of welding rods being stored therein, a welding head, means for passing said welding rods successively one after another close to said strip of sheet material, and a plurality of pairs of forming rollers, pulling said strip of sheet material off said rotary supply drum, wrapping the same successively about said welding rods so as to obtain a continuous welding wire, and passing said welding wire to said welding head.

3. A method for producing a continuous supply of welding wire composed of a core of single welding rods consisting of rigid, non-flexible material and a surrounding sleeve portion of flexible sheet material, comprising the steps of continuously pulling off said sheet material from a supply roll, forming said sheet material into a channel-like shape, passing, successively and continuously, said welding rods into said channel-shaped sheet material, and wrapping said sheet material about said welding rod, thereby obtaining an uninterrupted composite welding wire.

References Cited in the file of this patent

UNITED STATES PATENTS

| 1,525,840 | Weed | Feb. 10, 1925 |
| 2,190,150 | Fay | Feb. 13, 1940 |

FOREIGN PATENTS

| 440,842 | Great Britain | Jan. 7, 1936 |
| 441,834 | Great Britain | Apr. 21, 1934 |